United States Patent [19]

Horsch

[11] Patent Number: 4,853,851

[45] Date of Patent: Aug. 1, 1989

[54] SYSTEM FOR DETERMINING THE CODE COVERAGE OF A TESTED PROGRAM BASED UPON STATIC AND DYNAMIC ANALYSIS RECORDINGS

[75] Inventor: Axel Horsch, Boeblingen, Fed. Rep. of Germany

[73] Assignee: International Business Machines Corporation, Armonk, N.Y.

[21] Appl. No.: 942,307

[22] Filed: Dec. 16, 1986

[30] Foreign Application Priority Data

Dec. 30, 1985 [EP] European Pat. Off. ........ 85116652.0

[51] Int. Cl.⁴ ...................... G06F 11/00; G06F 7/04; G06F 15/36
[52] U.S. Cl. ................................ 364/300; 364/200; 371/19
[58] Field of Search ... 364/200 MS File, 900 MS File, 364/300; 371/19

[56] References Cited

U.S. PATENT DOCUMENTS

| 3,771,144 | 11/1973 | Belady et al. | 364/200 |
|---|---|---|---|
| 4,099,235 | 7/1978 | Hoschler et al. | 364/200 |
| 4,125,892 | 11/1978 | Fukuda et al. | 364/200 |
| 4,133,039 | 1/1979 | Eichenlaub | 364/300 X |
| 4,167,779 | 9/1979 | Sullivan et al. | 364/200 |
| 4,231,106 | 10/1980 | Heap et al. | 364/200 |
| 4,309,756 | 1/1982 | Beckler | 364/300 |
| 4,322,846 | 3/1982 | Carroll et al. | 364/200 |
| 4,392,208 | 7/1983 | Burrows et al. | 364/900 |
| 4,441,153 | 4/1984 | Bullions, III et al. | 364/200 |
| 4,484,269 | 11/1984 | Crain | 364/200 |
| 4,511,961 | 4/1985 | Penton | 364/200 |
| 4,554,630 | 11/1985 | Sargent et al. | 364/200 |
| 4,604,691 | 8/1986 | Akagi | 364/200 |
| 4,638,427 | 1/1987 | Martin | 364/200 |
| 4,656,631 | 4/1987 | Nowak | 371/19 |
| 4,710,863 | 12/1987 | Kaufmann et al. | 364/146 |

OTHER PUBLICATIONS

Thomas J. McCabe, "A Complexity Measure", IEEE Transactions on Software Engineering, vol. SE-2, No. 4, Dec. 1976, pp. 308-320.

Primary Examiner—Archie E. Williams, Jr.
Assistant Examiner—Danh T. Phung
Attorney, Agent, or Firm—Pollock, Vande Sande & Priddy

[57] ABSTRACT

System for analyzing programs by measuring the degree of code coverage of a program being tested during specific test phases. A correlation and comparison of results obtained from both a static and dynamic analysis recording is made. The introduction of a static and dynamic instruction flow indicator permits a determination of the test cover results by correlating the data of the static and dynamic instruction flow indicators. Thus, the number of untested functions can be determined during a test phase of a computer program before sending the data processing system to the field.

9 Claims, 4 Drawing Sheets

SYSTEM FOR DETERMINING THE CODE COVERAGE OF A TESTED PROGRAM BASED UPON STATIC AND DYNAMIC ANALYSIS RECORDINGS

BACKGROUND OF THE INVENTION

The invention relates to a method and a device for analyzing control programs for electronic data processing systems.

A determination of whether a user program or, in the next-lower program level in a data processing system, its control program has taken a predetermined course is mostly affected by means of coverage measurings supported on strict instruction/branch recordings of the actual program course. Carriage measurings of the instruction paths and switch-overs of program status words (PSW's), as well as switch-overs due to compulsory interruptions due to asynchronous processes (Traps) have formerly been implemented by means of program flow trace methods which, however, are on the one hand limited by the storage capacity of the trace unit, and on the other highly time-consuming in the finding of the instruction paths executed, since the program recordings have always to be compared with complex program models.

Program tests as they are implemented today require a high amount of system time for executing the necessary and available test programs and system control programs. Problems found during these testing activities are recorded, resolved and re-verified through specific testruns.

However, this approach has three major disadvantages:

1. The coverage of all test programs and system control programs (SCP) (system in the meaning of data processing system) is not known with respect to functional specification or machine architecture (Black Box Aspect).

2. The coverage of all test programs and system control programs is not known, either, with respect to the microcode coverage (White Box Aspect).

3. The buffer storage for recording the program flow (trace buffer) is of a limited capacity only and therefore has to be re-loaded into another (background) storage, with gaps resulting in the recording of the program flow, and cover measurings being consequently executable on a static basis only.

The consequence of these above disadvantages is that prior to the actual test period the test coordinator responsible for a new data processing system to be tested is compelled to collect all test programs available worldwide, and to run them on the test machine. As specified above, this is necessary only because the coverage of the respective program is not known, and because for reliability reasons as many test programs as possible have to be run.

If field problems are reported it usually shows that an error could not be located previously because the test programs available did not cover the defective function. The corresponding test program will subsequently be improved by this function, but it still remains unknown how many other functions are as yet uncovered. This actual state of affairs is unsatisfactory, particularly with respect to those uses which demand a very high availability of a data processing system.

SUMMARY OF THE INVENTION

It is therefore the object of the present invention to provide a method and a device for the cover analysis of user and system control programs which permits a comprehensive analysis with highly economic means.

The invention thus presents the advantage that the method and the device for analyzing programs measures the degree of code coverage of the program to be tested during specific test phases. The basic idea is a correlation and comparison of results obtained from static and dynamic analysis recordings. An essential feature is the development of the complexity definition of the programs basing on McCabe's theory of the program flow complexity of user programs. The introduction of a static and dynamic instruction flow indicator, as well as a method for determining the test cover results by correlating the data of the static and dynamic instruction flow indicator are an essential condition herefor.

Compared with known methods and devices, the invention presents the following additional advantages.

1. Well-timed determining of the static results,
2. High-speed determining of the cover results,
3. Instruction path recordings (by means of the mapping method through the instruction flow indicator) in real time,
4. No capacity problems with respect to time, storage capacity, data quantity during the dynamic examination in accordance with the mapping method (which does not carry out statistic measurings and ensures a 100% cover measuring),
5. The dynamic recording requires only the address lines of the microprogram storage comprising the system control program to be tested (instruction code or other signals are not required),
6. Determining for different cover results with only one test concept,
7. Simple combination of individual cover results of various program runs into one overall result,
8. Uncomplicated and clear representation of non-executed instructions, and instruction paths of non-executed branches and non-executed program entries, and
9. Representation of the trap-/program status word (PSW-) switchovers that have occurred.

BRIEF DESCRIPTION OF THE DRAWINGS

In the following, the invention will be described with reference to the drawings which depict the following:

FIG. 1 and 2 Basic representations explaining the McCabe theory of program complexity, FIG. 3 and 4 representations of graphs explaining the basic ideas of the invention, FIG. 5 a section of a control program used for explaining an embodiment, FIG. 6 to 9 the instruction flow indicator patterns of the control program sections in accordance with FIG. 5, FIG. 10 and 13 representations of address relations of a microinstruction, FIG. 11 a block circuit diagram of a dynamic instruction flow indicator, and FIG. 12 a pulse-/time diagram of the processes executed in the circuit arrangement in accordance with FIG. 11.

DESCRIPTION OF THE PREFERRED EMBODIMENT

McCabe's theory described in the article "A Complexity Measure" published in IEEE Transactions On Software Engineering, Vol. Se-2, No. 4, December 1976, pp. 308-320, will be described in detail below as far as it is of interest for the present invention.

The theory of program complexity in accordance with J. McCabe is based on the determining of the cyclomatic number developed from a graphical representation (in the following called graph) of the program flow. The complexity of a program which is determined from the cyclomatic number is structured of elements which cause branches. Functions themselves do not increase complexity, or the degree of complexity. This means that all sequential instructions between flow control instructions are omitted from consideration, and that only branch and collect instructions are considered. In the graph, these are represented as a small circle called a node. The possible paths from one node to the other are depicted as edges. A program flow diagram of that type is called a flow graph (or control graph).

In the following, the below given designations and definitions will be used:

| Designations: | Graph | $-G$ |
|---|---|---|
| | Edges | $-e$ |
| | Nodes | $-n$ |
| | Cyclomatic Number | $-V(G)$ |

Definition 1: The cyclomatic number of a program with single entry and output nodes is given according to McCabe by the formula $$V(G) = e - n + 2 \qquad (1)$$

Theorem 1: In a strictly connected graph G, the cyclomatic number V (G) is the maximum number of the linearly independent paths.

Theorem 2: Any path through graph G can be expressed as a linear combination of the set of linearly independent paths.

Computing the cyclomatic number in accordance with formula (1) involves counting all nodes 200, 201, 202 and locating as well as counting all edges 204, 205 by first drawing a flow graph of the program to be inspected, so that a number of problems/anomalies are generated, which means that the graph is not advisable for utilization.

On the other hand, the following solution according to the present invention seems easier to realize, with the only restriction that it can be applied to graphs with one respective entry 202 and exit node 203 only. There apply the following designations and definitions:

| Graph | $-G$ |
|---|---|
| Branch Nodes (Interrogation Box) | $-b$ |
| Collecting Nodes | $-c$ |
| Edges | $-e$ |
| Nodes | $-n$ |
| Cyclomatic Number | $-V(G)$ |

Theorem 3: The number of edges 204, 205 is:

$$e = 1 + 3b$$

Theorem 4: For each branch node 200 there exists a collecting node 201 so that the number of nodes obtained is:

$$n = b + c + 2b + 2$$

Theorem 5: The cyclomatic number V of graph G:

$$V(G) = e - n + 2 = (1 + 3b) - (2b + 2) + 2 = b + 1$$

Figure 1:
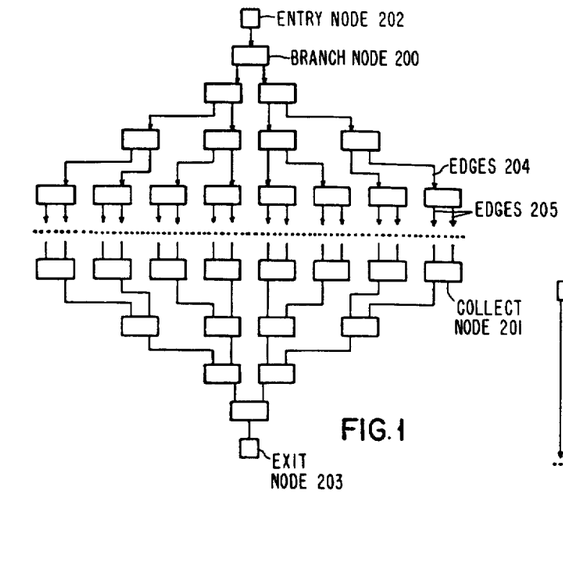

A graph where the correct number of edges for calculating the cyclomatic number can be obtained through direct reading has thus to be drawn with the elementary branch 200 and collect nodes 201. This means that an elementary branch node 200 also comprises three edges: An edge pointing to the node 204, and two edges pointing away from the node 205. An elementary collect node also consists of three edges: Two edges pointing to the node, and one edge pointing away from the node. FIG. 1 shows a corresponding decision tree taking into consideration Theorem 3.

Looking at the upper half of the tree, the following is found:
Sum of branch nodes: $b = 1 + 2 + 4 + 8 = 15$
Sum of edges: $p = 1 + 2 + 4 + 8 = 15$
Lower half of the tree:
Sum of collect nodes: $c = 8 + 4 + 2 + 1 = 15$
Sum of edges:
$$p2 = 8 + 4 + 2 + 1 = 15$$
Mid-range:
Edges:
$$p3 = b + 1 = 15 + 1 = 16$$

The number of open edges of a tree with b branches is $b + 1$. In a complete symmetrical tree the number of edges opening into a line equals twice the number of branches into this line, etc.

The total sum of the edges is the following:

$$p = p1 + p3 + p2 = 15 + 16 + 15 = 46$$

$$p = b + (b + 1) + c = 15 + (15 + 1) + 15 = 46$$

with $b = c$ $$p = 3b + 1 = 3 \times 15 + 1 = 46$$

Figure 2:
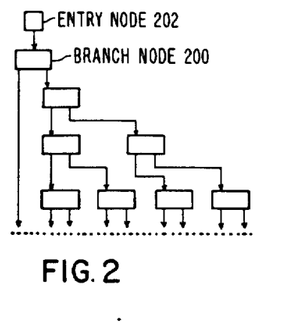

FIG. 2 shows another decision tree of a more general structure. This is an incomplete tree with b branches, where, as in the preceding example, the number of open edges is also $b + 1$:

$$p3 = b + 1 = 8 + 1 = 9$$

Theorem 3 is generally applicable on graphs with one entry node 202, since the formula for counting open edges includes the case of incomplete decision trees. Each graph with a single entry node 202 can therefore be represented as such a decision tree.

Theorem 5 shows that only the number of branch nodes is of importance, which means that only such instructions are counted for determining the cyclomatic number of a microprogram which cause branches. Microprograms which are generally unstructured frequently comprise more than one entry node 202 several exit nodes 203. The above specified formulas however do not consider this fact.

The above given result, i.e. $p3 = b + 1$ is remarkable in that it equals itself the cyclomatic number, so that the conclusion for any graph with single entry node 202 transformed in such a decision tree can be derived as follows:

The cyclomatic number equalling the number of linearly independent paths is the number of paths counted at the widest part of the program flow graph. This approach on the computation of the cyclomatic number has not yet been described by McCabe.

Figure 3:
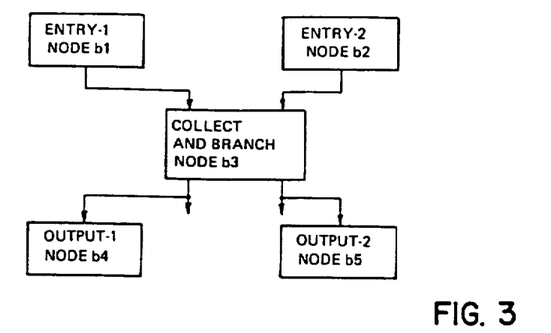

Since, as specified above, microprograms usually are not structured and optimized with respect to space and performance they frequently have multiple entry and/or exit nodes. The theory discussed below takes this fact into consideration and presents a mathematical solution. First, a graph with two entry nodes 202 and two exit nodes 203 is discussed, as depicted in FIG. 3. The linearly independent paths resulting from this graph Gb are given in the following Table 1.

TABLE 1

| | Linearly independent paths: | | | | |
|---|---|---|---|---|---|
| | Nodes | | | | |
| Path | b1 | b2 | b3 | b4 | b5 |
| 1 | • | | • | • | |
| 2 | • | | • | | • |
| 3 | | • | • | | • |

The fourth possible path (extending from b2 via b3 to b4) is no linearly independent path (following 1, 2, 3). This path can be construed by means of the following linear equation: path 4=path 1+path 3−path 2 (see Table 2).

TABLE 2

| | Node | | | | |
|---|---|---|---|---|---|
| Path | b1 | b2 | b3 | b4 | b5 |
| 1 | 1 | | 1 | 1 | |
| −2 | 1 | | 1 | | 1 |
| 3 | | 1 | 1 | | 1 |
| Sum 4 | 0 | 1 | 1 | 1 | 0 |

In graph Gb the number of linearly independent paths equals 3, so that the complexity of the program equals the cyclomatic number:

$V(Gb)=3$

Figure 4:
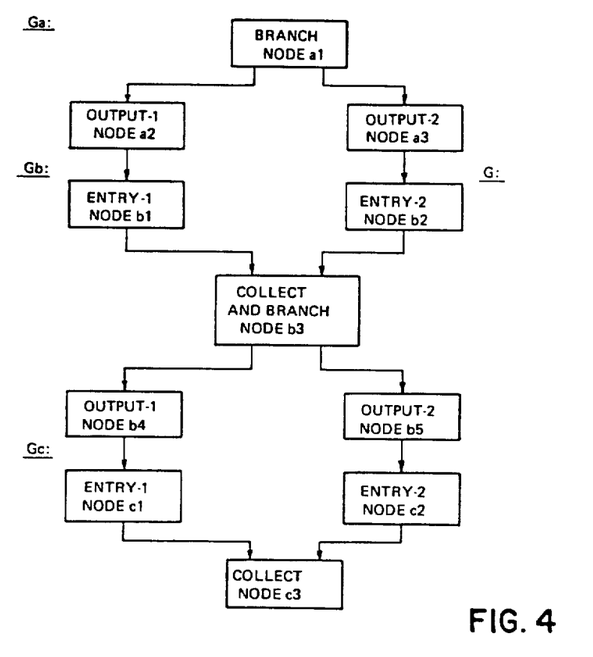

To provide such a graph with an entry and an exit node, in agreement with the requirements of the graph theory, two auxiliary graphs (Ga and Gc) are required which have to be added to graph Gb in order to obtain a new graph G satisfying the above conditions. As shown in FIG. 4 in this context, graph Ga generates an entry node, whereas graph Gc produces an exit node.

Table 3 informs on the linearly independent paths of graph G.

TABLE 3

| | Node | | | | | | | | | |
|---|---|---|---|---|---|---|---|---|---|---|
| Path | a1 | a2 | a3 | b1 | b2 | b3 | b4 | b5 | c1 | c2 | c3 |
| 1 | • | • | | • | | • | • | | • | | • |
| 2 | • | • | | • | | • | | • | | • | • |
| 3 | • | | • | | • | • | | • | | • | • |

This graph again comprises three independent paths, so that here, too, the cyclomatic number is $V(G)=3$.

Graph G is now a graph with a single entry and exit node. There applies the simplified formula (2):

Cyclomatic number $V(G)=b+1=2+1=3$.

This is the same cyclomatic number which was also found for the single graph Gb.

For a simplified computation for surroundings graphs the following set-up can be used:

TABLE 4

| | Nodes | | |
|---|---|---|---|
| Path | a1 | a2 | a3 |
| 1 | • | • | |
| 2 | • | | • |

Graph Ga comprises two independent paths, so that its cyclomatic number $V(Ga)=2$. The number of branching nodes is $b=1$.

Applying the simplified formula (2) to graph Ga results in a cyclomatic number $V(GA)=b+1=2$. This value equals the previous result. This means however that several exits (multiple exit nodes) do not increase the cyclomatic number of the graph, so that the simplified formula (2) can also be applied to graphs having several exits. If the graphic representation is considered this seems obvious because the complexity of several exits is comprised in the branch nodes of the graph. The linearly independent paths of graph Gc are given in Table 5.

TABLE 5

| | Nodes | | |
|---|---|---|---|
| Path | c1 | c2 | c3 |
| 1 | • | | • |
| 2 | | • | • |

Graph Gc comprises two linearly independent paths so that the cyclomatic number $V(Gc)=2$. The number of branch nodes is $b=0$.

If the simplified formula (2) is again applied to graph Gc a cyclomatic number $V(Gc)=0+1=1$ is obtained.

This result is obviously wrong, but if the number of supplementary entries are added the result obtained is correct. This demonstrates the effect of the "+1" in the simplified formula (2), for the "1" represents one single entry and has to be amended to n for n entries.

This modification is used in the present process and the associated device as a new definition for the complexity of unstructured microprograms.

For general graphs a less complicated method of calculation can be found. First, the following designations shall apply:

| Graph | —G |
|---|---|
| Branch Nodes | —b |
| Entry Nodes | —Y |
| Cyclomatic Number | —V (G) |

Theorem 6: The cyclomatic number V (Gi) of graph Gi with multiple entry and exit nodes is:

$$V(Gi)=b+y \quad (3)$$

When studying microprograms it can be seen that a program module does not consist of one single routine only. Frequently, a plurality of routines or subroutines with completely different functions are brought together into one module. It is therefore advantageous to define program complexity not only at module level but also at routine level.

The below described method also differs from the McCabe proposal for the processing of subroutines within a program. According to McCabe's suggestion, a value +1 is added to the program complexity for each subroutine (connected components: "p"-value). The below described method does not use this approach; it considers a subroutine-call as an unconditional branch which does not increase the complexity. The novel method, in fact, determines the complexity for a microprogram module on one level only but implements the determination for all program routines of a program module, as well as for the program module itself.

The preceding example is also useful for this object. In order to develop in a first test the cyclomatic number for a group of graphs the sum of the single cyclomatic numbers is structured as follows:

$$V(G) = V(Ga) + V(Gb)30 \ V(Gc) = 2 + 3 + 2 = 7$$

This manner of computing the cyclomatic number is obviously not correct, since the cyclomatic number of the complete graph has been computed for one single entry and one exit node.

To determine the correct cyclomatic number for a general group of graphs, formula (3) is used as adapted to each individual case. For that purpose, the branch nodes of the group and the addition of the sum of the entries of the group which is not used internally by the exit of the same group have to be summed up.

Again, the following designations have been selected:

| | |
|---|---|
| Group of graphs | —G |
| Single graph i | —Gi |
| Branch nodes | —b |
| Entry nodes of graph i | —yi |
| Entry nodes of the group | —y— |
| Number of graphs | —k |
| Cyclomatic number | —V (G) |

Theorem 7: The cyclomatic number V (G) of the group of graphs not necessarily comprising single and exit nodes is computed from the following equation:

$$V(G) = b + y'   \quad (4)$$

or with V (Gi) derived following formula (3) the cyclomatic number is $$V(G) = \text{sum}_{i=1}^{k} V(Gi) - \text{sum}_{i=1}^{k} yi + y' \quad (5)$$

It is thus the object of a static analysis program (STAP) to inform a control program tester by means of a few basic data about the complexity with respect of its structure of a predetermined control program sector. Basing on the theory of cyclomatic numbers a practical method has been realized by means of which each structured or unstructured program parts thereof can be analyzed. A cyclomatic number computed in accordance with formula (4) or (5) strictly refers to the quantity of linearly independent paths in the program or program sector investigated.

It has been pointed out at the beginning that the testing system substantially consists of three parts, i.e. first, the static analysis program STAP, second, the dynamic analysis tool DAT, and third, the analysis report program AREP.

The object of the static analysis program STAP is the generation of the following data for a control program module or a control program routine on the basis of its instruction list, and control program instructions (i.e. LABEL).

Complexity values (number of conditional branches plus program entries)
Number and location of conditional branches
Number and location of program entries
Statistic data with respect to number and type of branch instructions
Static instruction flow indicator plan of the control program.

Of particular importance is the generation of the above mentioned static instruction flow indicator plan of the control program routine or control program module examined which enables the analysis report program AREP to determine the code coverage in relation to the results of the dynamic analysis tool DAT.

For computing the cyclomatic number, and for generating an instruction flow indicator plan of a control program it is necessary to know whether the respective instruction is a predicate node, a functional node or a collect node, i.e. whether it is an unconditional, conditional or no branch instruction. Frequently, control programs comprise very powerful instructions, like multi-way branches to a tested condition, like "in case of N do". All these instructions have to be classified. The following table 6 represents such a classification, with the IBM 4361 channel processor being used as an example.

TABLE 6

| Class | Mnemonic | Predic. | Value b | Remarks |
|---|---|---|---|---|
| | BC | YES | 1 | Branch on condition |
| | BB | YES | 1 | Branch on Bit |
| | BP | YES | 1 | Branch on pattern |
| CON-DITIONAL | CCU | YES | 1 | Condition Switch to Control Column 1 |
| | CCD | YES | 1 | Conditional Switch to Control Column 2 |
| | BCC | YES | 2 | Ccw Command |
| | BCF VSE | YES | 6 | Ccw Flag |
| | BCF 370 | YES | 6 | Ccw Flag |
| | BNW4 | YES | 14 | Branch n-way (15-way) |
| | BNW8 | YES | 254 | Branch n-way (255-way) |
| | B | NO | 0 | Branch |
| | BLB | NO | 0 | Branch |

TABLE 6-continued

| Class | Mnemonic | Predic. | Value b | Remarks |
|---|---|---|---|---|
| UNCON- | BI | NO | 0 | Branch Indirect |
| DITIONAL | LEAVE | NO | 0 | LEAVE |
| | LASS | NO | 0 | Leave and Swap State |
| | BAL | NO | 0 | Branch and Link |
| | BLSS | NO | 0 | Branch and Link Swap State |
| | CU | NO | 0 | Switch to Control Column |
| | CD | NO | 0 | Switch to Control Column |
| NO | NOP | NO | 0 | No Operation |
| BRANCH | NBR | NO | 0 | No Branch |
| Function | any | NO | 0 | |
| | other | NO | 0 | |

To indicate the instruction type the static analysis program STAP associates to each instruction a 1-digit static instruction flow indicator IFI. This static instruction flow indicator indicates for each instruction address the instruction type, and whether the latter has an external entry associated thereto. By means of the static instruction flow indicator IFI and of the instruction flow indicator generated by means of the dynamic analysis tool DAT the coverage with respect to the instruction code, the branches and the instruction paths can be determined. For that purpose, the static instruction flow indicator employs the coding of instruction types listed in the below given Table 7.

TABLE 7

| IFI Digit | Instruction Type |
|---|---|
| 0 | No instruction found |
| 8 | No branch instruction |
| 4 | Unconditional branch instruction |
| C | Conditional branch instruction |
| 9 | No branch instruction with module/sub-program entry |
| 5 | Unconditional branch instruction with module/sub-program entry |
| D | Conditional branch instruction with module/sub-program entry |
| E | Multiway instruction |
| F | Multiway instruction with module/sub-program entry |
| 6 | NOP instruction |

In the following, a comparison of a pattern generation following a static and a dynamic analysis process by means of the static instruction flow indicator patterns and the dynamic instruction flow indicator patterns is to reveal differences which may be encountered when evaluating a control program flow or a part thereof.

Figure 5:
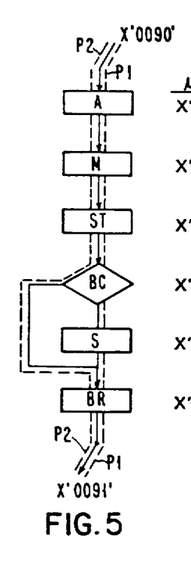

FIG. 5 shows a small part of a control instruction sequence reached in the control storage by an address X'0090' and continuing to an address X'0091'. The control program part selected as an example consists of an addition microinstruction (A) with the control storage address X'0000', a move microinstruction (M) with the control storage address X'0001', a storage microinstruction (ST) with the control storage address X'0002', a conditional branch microinstruction (BC) with the control storage address X'0003', furthermore of a subtraction microinstruction (S) with the control storage address (X'0004'), and finally of a branch microinstruction (BR) with the associated control storage address (X'0005'). (The representation of X'0005' equals the hexadecimal '5').

Figure 6:
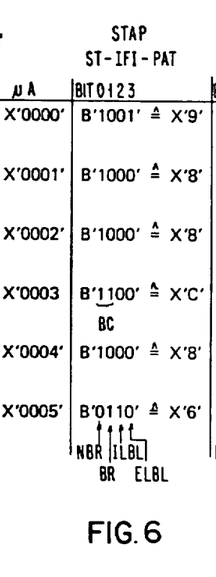
Figure 13:
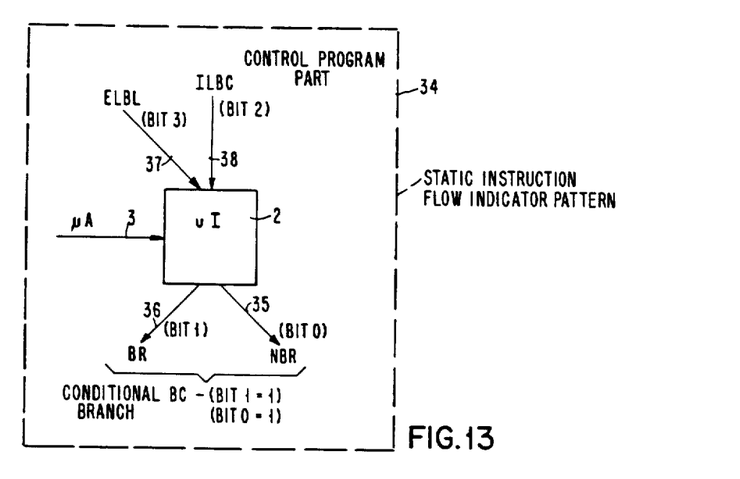

The static instruction flow indicator pattern ST-IFI-PAT associated to this program part and represented in FIG. 6 is machine-produced by means of the static analysis program STAP from the respective program list sector; these are data which according to the previously explained McCabe's theory supply information on the coverage concerning the code coverage and branch coverage of programs to be tested. FIG. 13 shows schematically how the information of one single microinstruction in a program list 34 is processed by the static analysis program STAP:

First, address 3 of the microinstruction ($\mu$-A) 2 is available for evaluation. Furthermore, the microinstructions are examined as to whether they are sequential (SE) or non-sequential (NSE) microinstructions. For the non-sequential microinstructions it is of interest whether they are reached owing to an internal entry from the same control program part or module just being examined, i.e. from an internal label 38 (ILBL), or from an external control program sector or module, i.e. from an external label 37 (ELBL). Following the above described McCabe theory, this information is essential for determining program coverage. A data processing system using the static analysis program STAP further determines for each micro- instruction whether it is a branch instruction 36 (BR) or no branch instruction 35 (NBR). The correlation of the bit positions in the static information flow indicator pattern is equally depicted in FIG. 13. If the just discussed microinstruction $\mu$I is no branch instruction NBR, bit 0 is set to one. If, on the other hand, this microinstruction is a branch instruction BR bit 1 is set to 1.

FIG. 13 also shows a further specific feature of the static instruction flow indicator ST-IFI, for the static analysis program also investigates whether a branch instruction is a conditional branch instruction BC. If this is so bit positions 0 and 1 are both set to 1.

If the instruction is reached by the discussed control program part (ILBL) bit 2 is set to 1. If the respective microinstruction is reached (ELBL) by another control program module or another control program sector bit 3 is set to 1.

If FIGS. 5 and 6 are considered jointly it will be observed that the static instruction flow indicator pattern ST-IFI-PAT generated of FIG. 6 can supply no information as to whether the control program part of FIG. 5 will move along path P1 or along path P2.

Generally, a static analysis program cannot examine the actual flow of a control program in a test run. This is performed by the dynamic analysis tool DAT which for each examined sector or module of a control program indicates the actually covered paths, in case of FIGS. 5, 7, 8 path P1 or P2.

Figure 10:
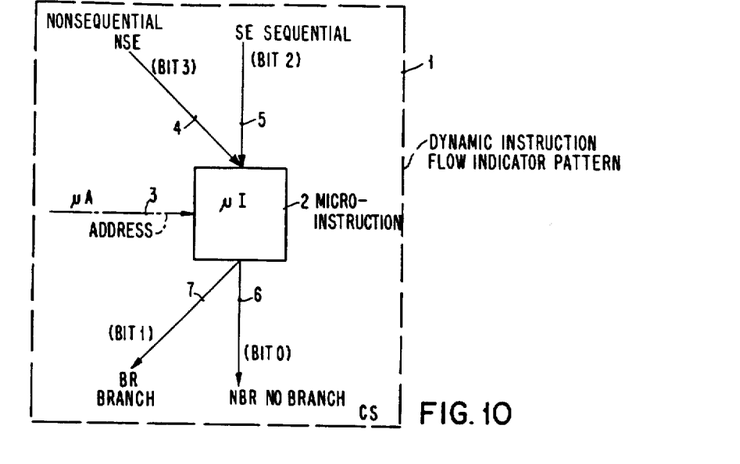

The dynamic instruction flow indicator pattern D-IFI-PAT is explained by FIG. 10 which differs from FIG. 13 in minor points only. For a microinstruction ($\mu$I)2 stored in control storage 1 its microinstruction address ($\mu$-A)3 is examined, along with the identification whether it is a sequential (SE)5 or a non-sequential (NSE)4 microinstruction. Sequential microinstructions, to give an example, in path P1 of FIG. 5 are the microinstructions BC, S, BR which directly follow each other. In path P2, on the other hand, microinstruction BR is a non-sequential instruction since it does not directly follow microinstruction S but is reached by a microinstruction BC which precedes it in flow direction. A sequential microinstruction differs from its preceding microinstruction in that its address is increased by the value 1. For non-sequential microinstructions this value does not equal 1, under the condition that all of these microinstructions are of such a length that they fit into a control storage position controlled by an address. If this is not so there apply other criteria for finding out whether a microinstruction is, or is not a sequential one. For a sequential instruction SE bit 2 is set to 1, and for a non-sequential microinstruction NSE bit 3 is set: to 1.

Furthermore, the microinstruction is examined as to whether it is a branch instruction (BR)7 or no branch instruction (NBR)6. FIG. 10 also shows the importance of the bit positions in the dynamic instruction flow indicator pattern D-IFI-PAT. If it is no branch instruction NBR bit 0 is set to 1, but if it is a branch instruction BR bit 1 is set to 1.

The bit positions are represented in FIGS. 6 to giving the respective dynamic instruction flow indicator patterns.

If, first, path P1 (along the dash-dotted line) is followed all microinstructions of this sector have a sequential instruction address sequence, i.e. from X'0000' to X'0005'. These microinstruction addresses refer to the control storage (CS)1. The static instruction flow indicator pattern ST-IFI-PAT belonging to this control program sector in FIG. 6 generates for each microinstruction of this sector the pattern belonging to bits 0 to 3.

The first microinstruction with the address X'0000', a microinstruction whose operational code characterizes it as an addition microinstruction (A) has a bit configuration where bit 0 is set to 1 because it is no branch instruction (NBR), a bit 1 set to 0 because it is no branch instruction (BR), a bit 2 set to 0 because it is not reached by an address entry from the same control program sector, and a bit 3 set to 1 because it is reached by an address outside the considered control program sector (ELBL), in the present case the address X'0090', and address still unknown in the static analysis. Consequently, a binary bit pattern B'1001' is obtained which in hexadecimal representation corresponds to the FIG. 9. (The representation B'1001' equals binary '1001').

Figure 7:
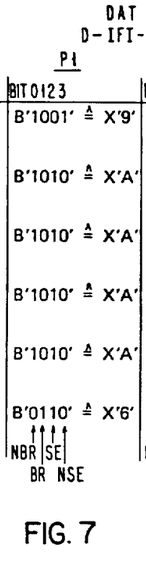
Figure 8:
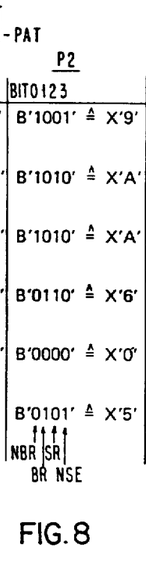

The corresponding dynamic instruction flow indicator pattern D-IFI-PAT has the same representation for paths P1 and P2 as indicated by those in FIGS. 7 and 8.

The next microinstruction of the studied control program sector has the address X'0001', and an operational code corresponding to a move instruction (M). The associated static instruction flow indicator pattern of FIG. 6 shows the binary pattern "1000" which in hexadecimal representation corresponds to the 8. This pattern is based on the operational code of this microinstruction, which code corresponds to no branch instruction (NBR), so that bit 0 is set to 1 and bit 1 to 0. Since this instruction was not reached on the strength of an internal (ILBL) or external (ELBL) entry, either, bits 2 and 3 of the static instruction flow indicator pattern are set to 0.

The associated dynamic instruction flow indicator pattern is the same for both paths P1 and P2 since they do not differ in that spot.

Similar conditions apply to the next microinstruction in FIG. 5 with the address X'0002', a storage microinstruction supplying the same instruction flow indicator pattern.

The next microinstruction in FIG. 5, a conditional branch instruction (BC) with the address X'0003' leads to a static instruction flow indicator pattern '1100', in hexadecimal 'C'. In accordance with the representation of FIG. 13, bits 0 and 1 are both set to 1 in order to indicate that this microinstruction is a conditional branch instruction. Since they cannot be reached by an internal (ILBL) or external (ELBL) LABEL bits 2 and 3 of the pattern are set to 0 (see FIG. 6).

When studying the dynamic instruction flow indicator pattern for path 1 it is assumed that the condition which would request a branch of the control program in this spot is not yet satisfied. Consequently, there has been no branch (NBR), and bit 0 of the dynamic instruction flow indicator pattern is set to 1. Simultaneously, bit 1 is set to 0 because there was no branch (BR). As a consequence, these two signals have to exclude each other. Since furthermore the address flow is sequential bit 2 is also set to 1 and bit 3 to 0.

The dynamic instruction flow indicator pattern for path P2 for which it is assumed that the condition for carrying out the branch has already been executed is of different design. The conditional branch instruction with the address X'0003' comprises, or leads to an information which indicates the address of the next microinstruction to be executed, in our case X'0005'. From this fact it can be concluded that this is a branch to be carried out, so that bit 0 is set to 0 and bit 1 to 1. As furthermore it is a sequential address (SE) bit 2 is also set to 1 and bit 3 to 0. The thus formed binary pattern '0110' corresponds to the hexadecimal value '6'.

The following instruction in the control program sector of FIG. 5, i.e. a shift instruction (S) with the hexadecimal address '0004' is no branch instruction, so that in the static instruction flow indicator pattern bit position 0 is set to 1 and bit position 1 to 0. Since this microinstruction is sequential too, bit positions 2 and 3 are also set to 0, so that a binary pattern '1000' or a hexadecimal value '8' are obtained.

The dynamic instruction flow indicator pattern for this microinstruction which is reached on path P1 only substantially corresponds to those of the above explained microinstructions M and ST.

In path P2 this shift microinstruction (S) is not reached, a fact which is expressed in the dynamic instruction flow indicator pattern in the binary as well as in the hexadecimal representation as a value 0, as shown in FIG. 8 in the second line from below ('0000' or '0').

The last microinstruction of the control program sector discussed is a branch instruction (BR) with the address X'0005'. The static instruction flow indicator pattern of FIG. 6 therefore shows in bit position 0 of the pattern a 0, in bit position 1 a 1, and a so in bit position 2, since this microinstruction is reached by an internal label ILBL. Since there is no external LABEL ELBL (entry) bit position 3 is a 0. In hexadecimal representation this pattern gives the value '6'.

The binary as well as the hexadecimal patterns are completely identical; they have been generated by the static analysis program and by the dynamic analysis tool for path P1, as shown by a comparison of FIGS. 6 and 7. The dynamic instruction flow indicator pattern for path 2 however has to be different, since the above discussed branch instruction BR was reached along path P2 via a non-sequential address, i.e. via address X'0003' rather than X'0004'. The dynamic instruction flow indicator pattern reached for path 2 therefore has the binary representation B-0101- which corresponds to a hexadecimal value '5' In the positions of the binary 1 in the dynamic instruction flow indicator pattern, i.e. in bit positions 1 and 3, FIG. 8 shows that the instruction involved is a branch instruction (BR) as well as a microinstruction reached non-sequentially by the preceding microinstruction. The equivalent hexadecimal value belonging to this binary representation is '5'.

Figure 9:
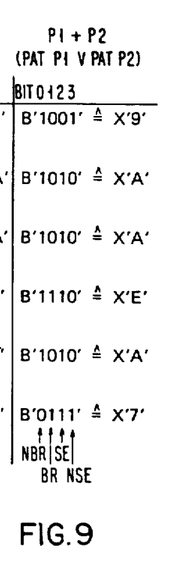
Figure 11:
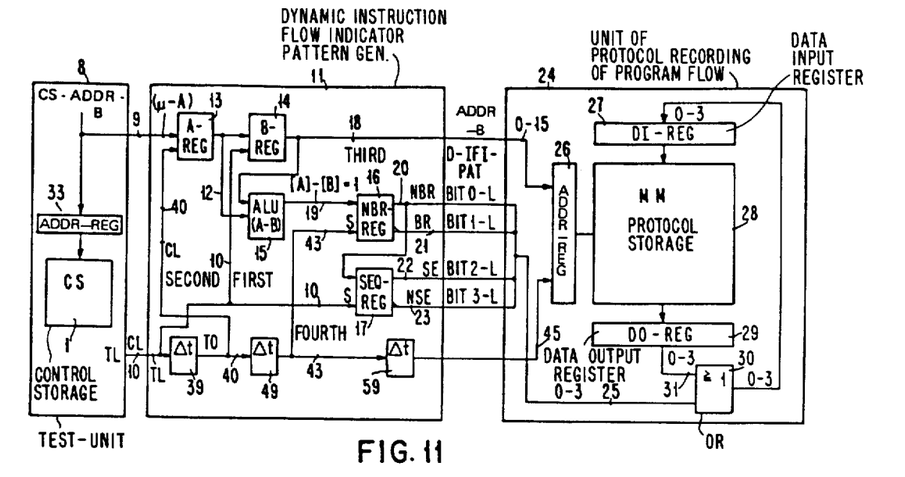

FIG. 9 shows the dynamic instruction flow indicator pattern for a case where the control program has taken path P1 as well as Path P2. The patterns are obtained from the ORing of the corresponding dynamic instruction flow indicator patterns and to store them in a protocol storage for further evaluation is depicted in FIG. 11. In connection with the signal/time time diagram of FIG. 12, a typical operational flow of this device is described below.

The dynamic analysis tool DAT consisting of unit 11 for generating the dynamic instruction flow indicator pattern, and unit 24 for the protocol recording of the program flow is substantially connected via line 9 to the control storage address bus CS-ADR-B, and line 10 to a clock-line CL of test unit 8, and electronic data processing system whose control storage (CS)1 and address register (ADR-REG) 33 are shown The microinstruction addresses μ-A reach via the control storage address bus the address register 33 where they respectively call a microinstruction from control storage 1. However, they also reach an A-register (A-REG) 13 via the parallel line 9 and, shifted by one microinstruction cycle, a B-register (B-REG) 14. The two registers 13 and 14 are input registers for an arithmetic and logic unit (ALU) 15 which exclusively implements a subtraction, i.e. contents register 13 minus contents register 14.

If the contents of registers 13 and 14 are sequential microinstruction addresses register 33 is always given a value which is higher by 1 than that of register 14. Since this does not apply for non-sequential microinstruction addresses the arithmetic and logic unit 15 can be used for differentiating between microinstructions with sequential, and others with non-sequential addresses.

Output line 19 of the arithmetic and logic unit 15 always carries an output signal corresponding to the logic level of the binary 1 in those cases where the subtraction content A-register minus content B-register is 1: (A)−(B) =1 if the microinstructions of the microinstruction set have the same length '1', i.e. if they fit into a storage position of the control storage. If this is not so, corresponding computations have to be made.

This output signal is applied to the input of a no-branch register (NBR-REG) 16. If register 16 has been set it produces on its output line 20 an NBR-signal which via the line for bit 0 (bit 0-L) of the dynamic instruction flow indicator pattern is transferred to device 24 for the protocol recording of the program flow. The data transfer by register 16 is effected via clock line 10 which is also connected to the set input S of this register.

The NBR-signal on output line 20 of register 16 is also transferred to the input of a register (SEQ-REG) 17 for indicating sequential or non-sequential microinstruction addresses whose set input S is also connected to clock line 10.

Delayed by one instruction cycle register 17 takes over the information in register 16 (e.g. the NBR-bit), converting it into another (e.g. SE-bit) which indicates a sequential address, after which it is presented on output line 22, in accordance with bit 2-L.

If register 16 comprises the information BR (branching) which is supplied on output line 21 corresponding to bit 1-L, register 17 generates the information NSE (non-sequential) made available via line 23 corresponding to bit 3-L.

So if there are microinstructions which do not have sequential addresses, i.e. branch instructions, the output lines 21 of register 16, and 23 of register 17 generate the BR- or NSE-signal, respectively, which via bit-line 2 (bit 1-L) or bit-line 3 (Bit 3-L) is transferred for protocol recording to device 24.

Figure 12:
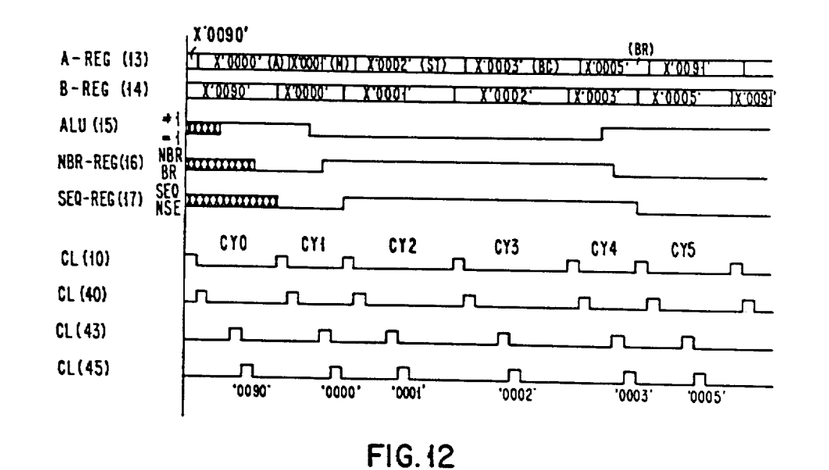

The execution with respect to time of the operations in the dynamic instruction flow indicator and the connected protocol recording device is controlled by the clock pulse rows CL (10), CL (40), CL (43) and CL (45) represented in the last 4 lines. With each respective leading edge of a pulse of clock pulse sequence CL (10) the microinstruction address of the first operating cycle CY0 which is at present in A-register 13, i.e. address X'0090', is taken over into B-register 14. The taking-over of the address of the next microinstruction from control storage address bus 9 into A-register 13 is controlled by the pulses of clock pulse sequence CL (40). Clock pulse sequence CL (40) originates from clock pulse sequence CL (10) through the delay in a delay circuit (Δt) 39. The delay time of delay circuit 39 is fixed in such a manner that the address transfer from the A-register to the B-register is fully terminated before the A-register is loaded with the next microinstruction address.

The arithmetic and logic unit (ALU) 15 to whose inputs the two microinstruction addresses from the A-register and the B-register are applied is given enough time to generate a result and make it available at output line 19. This is technically realized by a further delay circuit (Δt) 49 which at its output supplies the pulses of clock pulse sequence CL (43) with which the taking-over of the result of the arithmetic and logic unit 15 on line 19 through NBR-register 16 is controlled.

In the present example only the arithmetic and logic unit (15) can produce in operating cycle CY0 a valid output result, since NBR-register 16 and SEQ-register 17 cannot generate genuine values owing to the microinstruction address in the B-register which had been unknown at the beginning of the time discussion, a situation which in FIG. 12 is characterized by a signal course marked with crosses. been generated by the first pulse of clock sequence CL (43) through a delay in a further delay member (Δt) 59 therefore cannot take over a valid dynamic instruction flow indicator pattern via lines bit 0-L to bit 3-L into the protocol storage (MM) 28 under the microinstruction address in the B-register which has now been taken over into the address-register (ADR-REG 26) of the protocol device 24.

As shown in FIG. 12, operating cycle processor CY1 comprises in the A-register the address X'0001', and in the B-register the address X'0000'. After the expiration of their internal processing period the arithmetic and logic unit 15 forms the difference, in the present case the value 1 which via line 19 is transferred into NBR-register 16, generating an output signal on output line 20 there. This output signal NBR indicates that the microinstruction examined is no branch instruction; bit 0 of the dynamic instruction flow indicator pattern D-IFI-PAT is therefore 1. The SEQ-register 17 controlled by the clock pulse sequence CL (10) generates at the beginning of the operating cycle CY1 the output signal NSE (the microinstruction discussed is a non-sequential instruction), since at the end of operating cycle CY0 the NBR-register 16 had generated the output signal BR (the microinstruction discussed is a branch instruction). Under the address X'0000', in protocol storage 28 which is controlled by the second pulse shown of clock pulse sequence CL (43) therefore the following dynamic instruction flow indicator pattern is stored: B'1001'.

So the examination of the microinstruction with the address X'0000' by means of the dynamic instruction flow indicator has had the result that this microinstruction is no branch instruction that was reached by a non-sequential program entry, e.g. from another program module.

In the next working cycle CY2, the microinstruction with the address X'0001' i.e. the next one in the respective control program sector is examined. The A-register comprises address X'0002', and the B-register address X'0001'. These two registers which functionally are the input registers of the arithmetic and logic unit 15 contain values whose difference is 1. Consequently, register 16 is set by the third pulse of the clock pulse sequence CL (43) via its set input S to the output value NBR=1 and BR=0. Register 17 which previously had been set by the third pulse of clock pulse sequence CL (10) via set input S to the output value SE=1 and NSE=0 therefore is still in this signal state also at the moment of data transmission by the recording device 24, i.e. at the moment of the third pulse of clock pulse sequence CL (45), so that the dynamic instruction flow indicator pattern B'1010' is transferred into the protocol storage 28. This means that the microinstruction with the address X'0001' is a sequential microinstruction which is no branch instruction. It is a sequential microinstruction because its address differs from the address of its proceeding instruction only by the value +1 and, as shown in the top line of FIG. 12, it is also a move instruction (M), i.e. no branch instruction (NBR).

The instruction flow indicator patterns for the remaining microinstructions also shown in FIG. 12 are correspondingly generated in the above discussed manner, and they are transferred in protocol recording device 24 via line 25, an OR gate 30, a line 32 and a data input register (DI-REG) 27 into a protocol storage (MM) 28, and stored in precisely that location within this storage which is defined by the address in B-register 14. This address is transferred not only to the arithmetic and logic unit 15, but via a line 18 also to an address register 26 in logging unit 24. The moment of transfer is defined by the signals of clock CL (45) so that an instruction flow indicator pattern stable for the respective working cycle, e.g. CY2, can reach the logging storage.

What is claimed is:

1. A method of measuring the ratio between the number of functions executed in a computer program during testing of said computer program with a test program, and the total number of functions in said program to be tested, comprising:

executing said test program in said computer where said number of functions are executed;

determining from each instruction address of said computer program which is called for during execution of said test program a dynamic instruction flow indicator pattern, based on the address of a current and previous executed instruction, said pattern identifying:
 (a) no branch instruction, NBR;
 (b) branch instruction, BR;
 (c) sequential instruction, SE;
 (d) non-sequential instruction, NSE;

logging said dynamic instruction flow indicator patterns as they are developed in a logging device, each pattern representing an address of an instruction which produced said pattern;

determining a static instruction flow indicator pattern for each called instruction during testing from an operational code of said called instruction, said static instruction flow indicator pattern indicating whether said instruction is:
 (a) no branch instruction, NBR;
 (b) branch instruction, BR;
 (c) instruction reached by an internal entry (ILBL);
 (d) instruction reached by an external entry (ELBL); and comparing said static instruction flow indicator pattern with said dynamic instruction flow indicator pattern to determine a portion of all instructions of said computer program which have been tested.

2. A method as recited in claim 1 wherein the programs are tested in modules or sectors, respectively.

3. A method as recited in claim 1, wherein the dynamic and static instruction flow indicator patterns consist of 4-bit digits, with bit position 0 representing an NBR-bit, bit position 1 to the BR-bit, bit position 2 to the ILBL or the SE-bit, respectively, and bit position 3 to the ELBL or the NSE-bit, respectively.

4. A method as recited in claim 2 wherein the static and dynamic instruction flow indicator patterns (ST-IFI-PAT, D-IFI-PAT) consist of 4 bit digits, with bit position 0 being representative of the NBR-bit, bit position 1 to the BR-bit, bit position 2 to the ILBL or the SE-bit, respectively, and bit position 3 to the ELBL or the NSE-bit, respectively.

5. A method as recited in claim 1, wherein from the address of a later instruction and the address of a preceding instruction a difference is determined to identify whether the later instruction is nota branch instruction (NBR), which is the case if said difference is 1 with instructions of equal length, or n if the instruction lengths differ by the value of n, wherein a branch instruction (BR) is indicated if said difference does not equal 1 or n.

6. A method as recited in claim 2 wherein a difference between the address of a late instruction ad the address of a preceding instruction is determined, said difference determining whether the later instruction is not a branch instruction (NBR), which is the case if this difference is 1 with instructions of equal length, or n if the instruction lengths differ by the value of n, wherein a branch instruction (BR) is indicated if the difference does not equal 1 or n.

7. A method as recited in claim 3, wherein a difference between the address of an instruction and the address of a preceding instruction is determined, said difference determining whether the later instruction is not a branch instruction (NBR), which is the case if this difference is 1 with instructions of equal length, or n if the instruction lengths differ by the value of n, wherein branch instruction (BR) is indicated if the difference does not equal 1 or n.

8. A device for generating a dynamic instruction flow indicator pattern comprising:
- a dynamic instruction flow indicator connected to an instruction address line, and to a clock line of a computer being run by a computer program being tested, said indicator comprising:
    - a first register for storing a current instruction address of said computer program being tested;
    - a second register, serially connected with said first register, for storing a previous instruction address of said computer program being tested;
    - means connected to said clock line for generating first and second clock signals, said first clock signal transferring the contents of said first register to said second register, and said second clock signal which is delayed with respect to said first clock signal transferring the instruction address from said address line to said first register;
    - a difference circuit connected to said first and second registers which generates a difference signal representative of whether said current and previous instructions are a no branch instruction (NBR) or a branch instruction (BR);
    - a third register connected to said difference circuit and controlled by a third clock signal which is delayed from said first clock signal for generating binary signals NBR and BR, wherein NBR = 1 and BR = 0, when said difference signal indicates a NO BRANCH instruction, and NBR = 0 and BR = 1 when said difference signal indicates a BRANCH instruction; and,
    - a fourth register controlled by said first clock signal and receiving said binary NBR and binary BR signals, said fourth register generating additional binary signals SE and NSE, said binary signal SE = 1 and NSE = 0 when signal BR = 1, and said signals SE = 0 and NSE = 1 when said signal NBR = 1, whereby the binary signal value of NBR, BR, SE, and NSE constitute a dynamic instruction flow indicator pattern.

9. A device according to claim 8 further comprising:
- a logging device for storing instruction flow indicator patterns, having a control storage device, said control storage device having a size related to the size of the computer program being tested, and, having a data input connected to said third and fourth registers; and,
- an address register connected to said second register for receiving an instruction address being examined, controlled by a fourth clock signal which is delayed from said third clock signal, said address register addressing said control storage device when said third and fourth registers produce a dynamic instruction flow indicator pattern.

* * * * *